April 12, 1927.
J. E. DEMPSEY ET AL
1,624,040
CORN POPPER
Filed Dec. 21, 1925
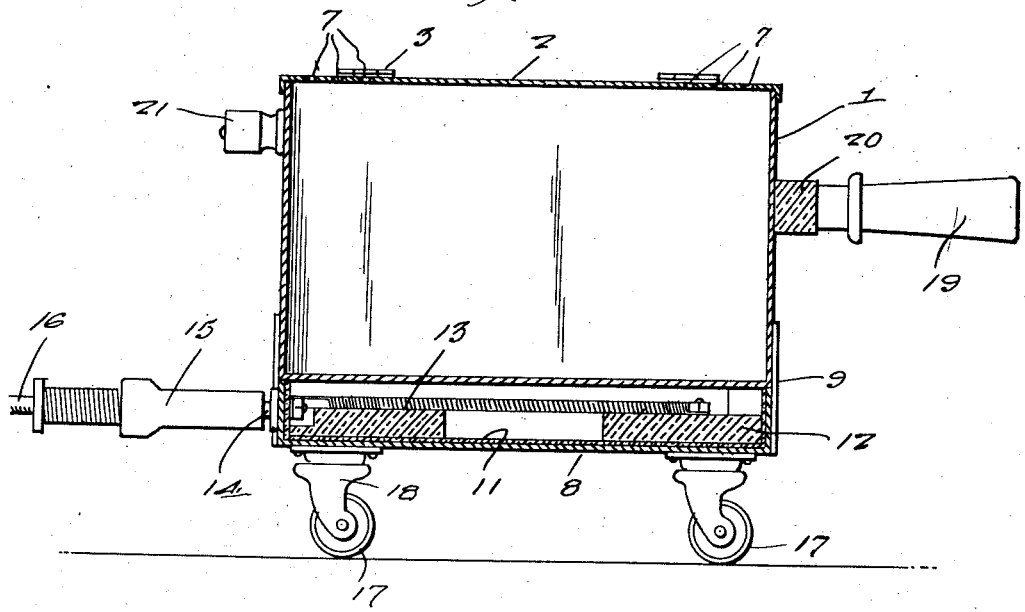
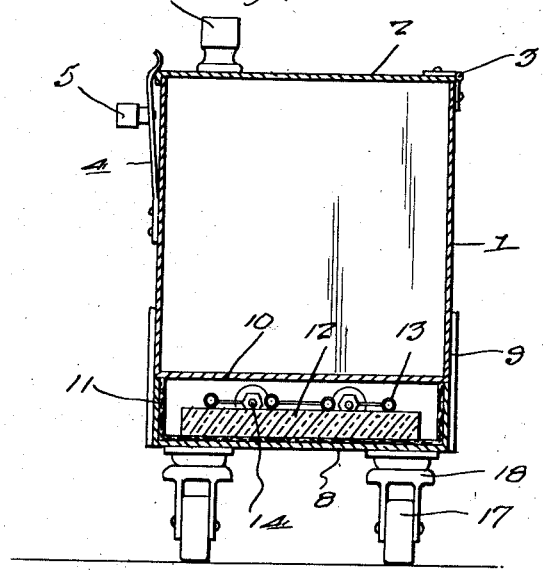
Inventors
J. E. Dempsey
Le Roy E. Burton
By Clarence A. O'Brien
Attorney Patented Apr. 12, 1927.

1,624,040

UNITED STATES PATENT OFFICE.

JAMES E. DEMPSEY AND LEROY E. BURTON, OF JOHNSTON CITY, ILLINOIS.

CORN POPPER.

Application filed December 21, 1925. Serial No. 76,690.

This invention relates to improvements in corn poppers, and is more particularly adapted to one which includes an electrically heated compartment in which the grains of corn are placed and are subjected to the heat so as to produce popped corn.

Another important object of the present invention is to provide a corn popper which is of such novel construction as to permit the same to be used as a household article, rollers being associated with the device to facilitate the reciprocatory movement of the receptacle on a table or the like for agitating the corn placed within the receptacle to be popped.

A still further object is to provide a corn popper which will eliminate the accumulation of dust and dirt, when in use, thereby rendering the operation of the device more sanitary.

A still further object is to provide an electric corn popper which is simple in construction, inexpensive, strong and durable and further well adapted to the purpose for which it is designed.

Other objects and advantages of the invention will become apparent during the course of the following description taken in connection with the accompanying drawing.

In the accompanying drawing forming part of this application and in which like numerals designate like parts throughout the same:

Figure 1 is a longitudinal sectional view through the corn popper embodying our invention, and Figure 2 is a transverse vertical section.

In the drawing, wherein for the purpose of illustration is shown the preferred embodiment of our invention, the numeral 1 designates a substantially rectangular shaped casing or receptacle, the same being open at its top. A hinged closure 2 is associated with the open top of the receptacle, the hinged connection between the cover and one of the longitudinal edges of the receptacle being shown at 3. A spring clip 4 is secured on the front side of the receptacle and cooperates with the forward longitudinal edge of the cover 2 in securing the latter in a closed position. A suitable knob or handle 5 is associated with the spring clip for disengaging the same from the cover to permit the latter to be swung upwardly to an open position and a handle 6 is associated with the cover for raising and lowering the same. The hinged cover or closure 2 is further provided with a series of spaced openings 7, and the purpose thereof will be hereinafter more fully described.

An electric heating element casing 8 of the same shape and size as the receptacle 1 is adapted to be secured on the bottom of the receptacle, and to this end, there is provided at the corners the securing angular brackets 9. The casing 8 is open at its top and the bottom 10 of the receptacle rests on the upper edges of the sides and ends of the casing in the manner as clearly illustrated in the drawing. By securing the electric heating element supporting casing 8 to the bottom of the receptacle 1, a unitary structure is provided.

This casing 8 is lined with suitable insulation as shown at 11 and adapted to be arranged within this casing are a block of insulating material 12 on which is mounted the electric heating elements 13. The latter are of the well known construction, and as the same forms no important part of the present invention, a further detailed description thereof is not thought necessary.

The terminals for the electric heating elements 13 are indicated at 14 and the same extend through one end of the casing 8 so as to project beyond the outer end thereof and permit the attachment of an electric socket 15, the latter having communication with a suitable source of supply through the medium of the wire 16. When the socket 15 is attached on the terminals 14, and the current which flows through the wire 16 is turned on, the electric heating elements 13 will function in the manner well known in the art.

For the purpose of facilitating the reciprocatory movement of the corn popper, there is provided on the bottom of the casing 8 at the corners thereof, the rollers 17. These rollers are mounted in suitable casters 18 and if desired, the rollers may be provided with rubber surface engaging rings on their peripheral faces so as not to mar or deface the furniture on which the device is placed. A relatively large handle 19 is secured on one end of the receptacle 1 adjacent the top thereof and is insulated therefrom through the medium of the strip 20. An additional handle 21 in the form of a knob is secured on the other end of the receptacle as clearly illustrated in Figure 1.

In use, the corn to be popped is placed within the receptacle 1, and the cover 2 is swung to a closed position. The socket 15 is then attached to the free ends of the terminals 14 and the current is turned on. The device is then moved backward and forward on a table or any other suitable support by actuating the handle 19 so as to agitate the grains of corn within the receptacle, and in this manner, the heat from the heating elements 13 will pass upwardly through the receptacle thoroughly heating the grains of corn whereby the corn will be properly popped.

The openings 7 provided in the cover 2 will permit the fumes and surplus heat to escape from the receptacle.

The provision of an electric corn popper of the above mentioned character will enable corn to be popped more easily and efficiently than by the methods now employed and furthermore the accumulation of dust and dirt incident to the popping of corn will be eliminated due to the construction of our improved device. After all the corn has been popped, the same is discharged from the receptacle, by grasping the handles 19 and 21 and inverting the same after the cover has been swung to an open position. Also by providing an electric corn popper of the above mentioned character, there will be no possibility of the operator coming in contact with the source of heat and burning his hands, such as frequently happens with the use of ordinary hand type of corn poppers now on the market.

A device of the above mentioned character will provide a useful household article, and its simplicity enables the same to be manufactured at a very low cost, yet be strong and durable.

While we have shown the preferred embodiment of our invention, it is to be understood that minor changes in the size, shape, and arrangement of parts may be resorted to without departing from the spirit or scope of the invention.

Having thus described the invention, what we claim as new is:—

A wheeled corn popper of the class described comprising in combination, an open top receptacle, a cover therefor, an open top casing, the lower edges of the receptacle adapted to rest on the upper edges of the open top casing, angular securing brackets at the corners of the casing and the receptacle on the outer side thereof for securing the same together providing a unitary structure, an insulated block arranged within the casing, electrical heating units mounted on the block, the terminals for the electrical heating units projecting outwardly through one end of the casing, surface engaging rollers carried by the bottom of the casing, and a handle secured on one end of the receptacle for facilitating the reciprocatory movement thereof.

In testimony whereof we affix our signatures.

JAMES E. DEMPSEY.
LEROY E. BURTON.